United States Patent
Erivantcev et al.

(10) Patent No.: US 11,093,036 B2
(45) Date of Patent: *Aug. 17, 2021

(54) TRACKING ARM MOVEMENTS TO GENERATE INPUTS FOR COMPUTER SYSTEMS

(71) Applicant: Finch Technologies Ltd., Tortola (VG)

(72) Inventors: Viktor Vladimirovich Erivantcev, Ufa (RU); Rustam Rafikovich Kulchurin, Ufa (RU); Alexander Sergeevich Lobanov, Ufa (RU); Iakov Evgenevich Sergeev, Ufa (RU); Alexey Ivanovich Kartashov, Moscow (RU)

(73) Assignee: Finch Technologies Ltd., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,249

(22) Filed: Jul. 10, 2019

(65) Prior Publication Data

US 2019/0332171 A1    Oct. 31, 2019

Related U.S. Application Data

(63) Continuation of application No. 15/787,555, filed on Oct. 18, 2017, now Pat. No. 10,379,613.

(Continued)

(51) Int. Cl.
*G06F 3/01*    (2006.01)
*G06F 3/0346*    (2013.01)
(Continued)

(52) U.S. Cl.
CPC .............. *G06F 3/014* (2013.01); *A63F 13/211* (2014.09); *A63F 13/212* (2014.09);
(Continued)

(58) Field of Classification Search
CPC ........ G06F 3/0346; G06F 3/011; G06F 3/017; A63F 13/211; A63F 13/212; A63F 13/235
See application file for complete search history.

(56) References Cited

U.S. PATENT DOCUMENTS

| 7,565,295 B1 * | 7/2009 | Hernandez-Rebollar ................... G06K 9/00355 382/182 |
| 8,187,100 B1 | 5/2012 | Kahn et al. |

(Continued)

FOREIGN PATENT DOCUMENTS

| CN | 103226398 | 7/2013 |
| WO | 2016183812 | 11/2016 |
| WO | 2016209819 | 12/2016 |

OTHER PUBLICATIONS

Devices for Controlling Computers Based on Motions and Positions of Hands, U.S. Appl. No. 15/492,915, filed Apr. 20, 2017, Viktor Erivantcev, et al, Response to Non-Final Office Action Entered and Forwarded to Examiner, dated Apr. 11, 2019.

(Continued)

*Primary Examiner* — Kenneth B Lee, Jr.
(74) *Attorney, Agent, or Firm* — Greenberg Traurig (57) ABSTRACT

A system including: a first sensor module having an inertial measurement unit and attached to an upper arm of a user, the first sensor module generating first motion data identifying an orientation of the upper arm; a second sensor module having an inertial measurement unit and attached to a hand of the user, the second sensor module generating second motion data identifying an orientation of the hand; and a computing device coupled to the first sensor module and the second sensor module through communication links, the computing device calculating, based on the orientation of the upper arm and the orientation of the hand, an orientation (Continued)

of a forearm connected to the hand by a wrist of the user and connected to the upper arm by an elbow joint of the user.

17 Claims, 3 Drawing Sheets

Related U.S. Application Data (60) Provisional application No. 62/507,085, filed on May 16, 2017.

(51) Int. Cl.
*A63F 13/211* (2014.01)
*A63F 13/212* (2014.01)
*A63F 13/235* (2014.01)

(52) U.S. Cl.
CPC ............ *A63F 13/235* (2014.09); *G06F 3/011* (2013.01); *G06F 3/017* (2013.01); *G06F 3/0346* (2013.01)

(56) References Cited

U.S. PATENT DOCUMENTS

| | | | |
|---|---|---|---|
| 8,933,886 | B2 | 1/2015 | Imoto et al. |
| 8,988,438 | B2 | 3/2015 | Bang et al. |
| 9,141,194 | B1 | 9/2015 | Keyes et al. |
| 9,278,453 | B2 * | 3/2016 | Assad ................... B25J 9/1694 |
| 9,405,372 | B2 | 8/2016 | Yen et al. |
| D772,986 | S | 11/2016 | Chen et al. |
| 9,504,414 | B2 | 11/2016 | Coza et al. |
| 9,600,925 | B2 | 3/2017 | Katz et al. |
| 9,891,718 | B2 * | 2/2018 | Connor ................... G06F 3/017 |
| 9,996,945 | B1 | 6/2018 | Holzer et al. |
| 10,019,806 | B2 | 7/2018 | Perry et al. |
| 10,379,613 | B2 * | 8/2019 | Erivantcev .............. G06F 3/014 345/156 |
| 10,509,464 | B2 | 12/2019 | Erivantcev et al. |
| 10,509,469 | B2 | 12/2019 | Erivantcev et al. |
| 10,521,011 | B2 | 12/2019 | Erivantcev et al. |
| 10,534,431 | B2 | 1/2020 | Erivantcev et al. |
| 10,540,006 | B2 | 1/2020 | Erivantcev et al. |
| 10,705,113 | B2 | 7/2020 | Erivantcev et al. |
| 2003/0142065 | A1 | 7/2003 | Pahlavan |
| 2007/0050597 | A1 | 3/2007 | Ikeda |
| 2007/0263001 | A1 * | 11/2007 | Trzecieski ............... G06F 3/011 345/473 |
| 2007/0273610 | A1 | 11/2007 | Baillot |
| 2008/0088468 | A1 | 4/2008 | Kim |
| 2008/0262772 | A1 | 10/2008 | Luinge et al. |
| 2009/0322763 | A1 | 12/2009 | Bang et al. |
| 2010/0079466 | A1 | 4/2010 | Griffin |
| 2011/0161804 | A1 | 6/2011 | Park et al. |
| 2012/0025945 | A1 | 2/2012 | Yazadi et al. |
| 2012/0130203 | A1 | 5/2012 | Stergiou et al. |
| 2012/0214591 | A1 | 8/2012 | Ito et al. |
| 2012/0293410 | A1 | 11/2012 | Bell |
| 2013/0317648 | A1 | 11/2013 | Assad |
| 2014/0028547 | A1 | 1/2014 | Bromley et al. |
| 2014/0201689 | A1 | 7/2014 | Bedikian et al. |
| 2014/0313022 | A1 | 10/2014 | Moeller et al. |
| 2015/0062086 | A1 | 3/2015 | Nattukallingal |
| 2015/0077347 | A1 | 3/2015 | OGreen |
| 2015/0145860 | A1 | 5/2015 | Craig et al. |
| 2015/0145985 | A1 | 5/2015 | Gourlay et al. |
| 2015/0213653 | A1 | 7/2015 | Kord |
| 2015/0277559 | A1 | 10/2015 | Vescovi et al. |
| 2015/0358543 | A1 | 12/2015 | Kord |
| 2016/0005232 | A1 | 1/2016 | Quarles |
| 2016/0054797 | A1 | 2/2016 | Tokubo et al. |
| 2016/0077608 | A1 | 3/2016 | Nakasu et al. |
| 2016/0187969 | A1 | 6/2016 | Larsen et al. |
| 2016/0306431 | A1 | 10/2016 | Stafford et al. |
| 2016/0313798 | A1 | 10/2016 | Connor |
| 2016/0378204 | A1 | 12/2016 | Chen et al. |
| 2017/0053454 | A1 | 2/2017 | Katz et al. |
| 2017/0083084 | A1 | 3/2017 | Tatsuta et al. |
| 2017/0115728 | A1 | 4/2017 | Park et al. |
| 2017/0308165 | A1 | 10/2017 | Erivantcev et al. |
| 2017/0347885 | A1 | 12/2017 | Tan et al. |
| 2017/0352188 | A1 | 12/2017 | Levitt |
| 2018/0095637 | A1 | 4/2018 | Valdivia et al. |
| 2018/0101989 | A1 | 4/2018 | Frueh et al. |
| 2018/0165879 | A1 | 6/2018 | Holzer et al. |
| 2018/0217680 | A1 | 8/2018 | Sudou et al. |
| 2018/0225517 | A1 | 8/2018 | Holzer et al. |
| 2018/0253142 | A1 | 9/2018 | Tsuchie et al. |
| 2018/0313867 | A1 | 11/2018 | Erivantcev et al. |
| 2018/0330521 | A1 | 11/2018 | Samples et al. |
| 2018/0335834 | A1 | 11/2018 | Erivantcev et al. |
| 2018/0335843 | A1 | 11/2018 | Erivantcev et al. |
| 2018/0335855 | A1 | 11/2018 | Erivantcev et al. |
| 2019/0187784 | A1 | 6/2019 | Erivantcev et al. |
| 2019/0212359 | A1 | 7/2019 | Erivantcev et al. |
| 2019/0212807 | A1 | 7/2019 | Erivantcev et al. |
| 2020/0081534 | A1 | 3/2020 | Erivantcev et al. |

OTHER PUBLICATIONS

Calibration of Inertial Measurement Units Attached to Arms of a User to Generate Inputs for Computer Systems, U.S. Appl. No. 15/817,646, filed Nov. 20, 2017, Viktor Erivantcev, et al, Docketed New Case—Ready for Examination, Jan. 10, 2018.

Tracking Arm Movements to Generate Inputs for Computer Systems, U.S. Appl. No. 15/787,555, filed Oct. 18, 2017, Viktor Erivantcev, et al, Non Final Action dated Nov. 9, 2018.

Tracking Finger Movements to Generate Inputs for Computer Systems, U.S. Appl. No. 15/792,255, filed Oct. 24, 2017, Viktor Erivantcev, et al, Docketed New Case—Ready for Examination, Jan. 9, 2018.

Tracking Torso Orientation to Generate Inputs for Computer Systems, U.S. Appl. No. 15/813,813, filed Nov. 15, 2017, Viktor Erivantcev, et al, Docketed New Case—Ready for Examination, Jan. 17, 2018.

Calibration of Inertial Measurements Units Attached to Arms of a Uswer and to a Head Mounted Device, U.S. Appl. No. 15/847,669, filed Dec. 19, 2017,Viktor Erivantcev, et al, Non Final Action dated Apr. 8, 2019.

Correction of Accumulated Errors in Intertial Measurement Units Attached to a User, U.S. Appl. No. 15/868,745, filed Jan. 11, 2018, Viktor Erivantcev, et al, Docketed New Case—Ready for Examination, Mar. 2, 2018.

Tracking Torso Leaning to Generate Inputs for Computer Systems, U.S. Appl. No. 15/864,860, filed Jan. 8, 2018, Viktor Erivantcev, et al, Docketed New Case—Ready for Examination, Feb. 12, 2018.

Tracking User Movements to Control a Skeleton Model in a Computer System, U.S. Appl. No. 15/973,137, filed May 7, 2018, Viktor Erivantcev, et al, Docketed New Case—Ready for Examination, Jul. 2, 2018.

Motion Predictions of Overlapping Kniematic Chains of a Skeleton Model Used to Control a Computer System, U.S. Appl. No. 15/996,389, filed Jun. 1, 2018, Viktor Erivantcev, et al, Allowed—Notive of Allowance Not Yet Mailed, dated Apr. 10, 2019.

Calibration of Measurement Units in Alignment with a Skeleton Model to Control a Computer System, U.S. Appl. No. 16/044,984, filed Jul. 25, 2018, Viktor Erivantcev, et al, Docketed New Case— Ready for Examination, Aug. 27, 2018.

Accessories for Vive, retrieved from https://www.vive.com/us/accessory/ on Jan. 30, 2017.

Daydream, retrieved from https://vr.google.com/daydream/ on Jan. 30, 2017.

Forward kinematics, Wikipedia, retrieved from https://en.wikipedia.org/wiki/Forward_kinematics on Sep. 21, 2017.

Gest—Work with your hands. Wayback Machine 2016. Retrieved from https://web.archive.org/web/20160304012247/https://gest.co/ on Jan. 30, 2017.

(56) References Cited

OTHER PUBLICATIONS

Gloveone: Feel Virtual Reality. Wayback Machine 2016. Retrieved from https://web.archive.org/web/20160307080001/https://www.gloveonevr.com/ on Jan. 30, 2017.
International Application No. PCT/US2017/028982, International Search Report and Written Opinion, dated Aug. 24, 2017.
Manus VR—The Pinnacle of Virtual Reality Controllers, Manus VR Development Kit Pro Q4 2016.
Manus VR—The virtual reality dataglove for consumers. Wayback Machine 2016. Retrieved from https://web.archive.org/web/20160417035626/https://manusvr. com/ on Jan. 30, 2017.
NeuroDigital: The VR Technology Factory, retrieved from https://www.neurodigital.es/ on Jan. 30, 2017.
Oculus Rift | Oculus. Retrieved from https://www3.oculus.com/enus/ rift/ on Jan. 30, 2017.
RevolVR Virtual Reality Controllers, retrieved from http://revolvr.co/ on Jan. 30, 2017.
Wireless Gaming Controllers for PC, Mac, and Mobile | SteelSeries, retrieved from https://steelseries.com/gamingcontrollers on Jan. 30, 2017.
Xbox Wireless Controller, retrieved from http://www.xbox.com/en-US/xbox-one/accessories/controllers/xbox-wireless-controller on Jan. 30, 2017.
Devices for Controlling Computers Based on Motions and Positions of Hands, U.S. Appl. No. 15/492,915, filed Apr. 20, 2017, Viktor Erivantcev et al., Patented Case, Nov. 26, 2019.
Devices for Controlling Computers Based on Motions and Positions of Hands, U.S. Appl. No. 16/683,648, filed Nov. 14, 2019, Viktor Erivantcev et al., Docketed New Case—Ready for Examination, Dec. 3, 2019.
Calibration of Inertial Measurement Units Attached to Arms of a User to Generate Inputs for Computer Systems, U.S. Appl. No. 15/817,646, filed Nov. 20, 2017, Viktor Erivantcev et al., Notice of Allowance Mailed—Application Received in Office of Publications, dated Feb. 28, 2020.
Tracking Arm Movements to Generate Inputs for Computer Systems, U.S. Appl. No. 15/787,555, filed Oct. 18, 2017, Viktor Erivantcev et al., Patented Case, Jul. 24, 2019.
Tracking Finger Movements to Generate Inputs for Computer Systems, U.S. Appl. No. 15/792,255, filed Oct. 24, 2017, Viktor Erivantcev et al., Patented Case, Dec. 24, 2019.
Tracking Torso Orientation to Generate Inputs for Computer Systems, U.S. Appl. No. 15/813,813, filed Nov. 15, 2017, Viktor Erivantcev et al., Patented Case, Jan. 1, 2020.
Calibration of Inertial Measurement Units Attached to Arms of a User and to a Head Mounted Device, U.S. Appl. No. 15/847,669, filed Dec. 19, 2017, Viktor Erivantcev et al., Patented Case, Dec. 11, 2019.
Correction of Accumulated Errors in Inertial Measurement Units Attached to a User, U.S. Appl. No. 15/868,745, filed Jan. 11, 2018, Viktor Erivantcev et al., Non Final Action Counted, Not Yet Mailed, dated Mar. 29, 2020.
Tracking Torso Leaning to Generate Inputs for Computer Systems, U.S. Appl. No. 15/864,860, filed Jan. 8, 2018, Viktor Erivantcev et al., Patented Case, Nov. 26, 2019.
Tracking User Movements to Control a Skeleton Model in a Computer System, U.S. Appl. No. 15/973,137, filed May 7, 2018, Viktor Erivantcev et al., Non Final Action dated May 13, 2019.
Motion Predictions of Overlapping Kinematic Chains of a Skeleton Model Used to Control a Computer System, U.S. Appl. No. 16/827,573, filed Mar. 23, 2020, Viktor Erivantcev et al., Non Final Action Counted, Not Yet Mailed, dated Apr. 21, 2020.
Calibration of Measurement Units in Alignment with a Skeleton Model to Control of a Computer System, U.S. Appl. No. 16/044,984, filed Jul. 25, 2018, Viktor Erivantcev et al., Non Final Action dated Feb. 6, 2020.

* cited by examiner

Receive motion data from an arm module identifying an orientation of an upper arm of a user  201

↓

Receive motion data from a handheld module identifying an orientation of a hand of the user  203

↓

Calculate an orientation of a forearm of the user connecting the hand and the upper arm without a sensor module on the forearm  203

TRACKING ARM MOVEMENTS TO GENERATE INPUTS FOR COMPUTER SYSTEMS

RELATED APPLICATIONS

The present application is a continuation application of U.S. Pat. App. Ser. No. 15/787,555, filed Oct. 18, 2017, issued as U.S. Pat. No. 10,379,613 on Aug. 13, 2019, and entitled "Tracking Arm Movements to Generate Inputs for Computer Systems," which claims the benefit of the filing date of Prov. U.S. Pat. App. Ser. No. 62/507,085, filed May 16, 2017 and entitled "Methods, Systems, and Apparatuses for Calculating the Position of a Skeletal 3-D Model in Space using Predictive Interpolation Algorithms", the entire disclosures of which applications are hereby incorporated herein by reference.

The present application relates to U.S. patent application Ser. No. 15/492,915, filed Apr. 20, 2017, assigned U.S. Pat. App. Pub. No. 2017/0308165, and entitled "Devices for Controlling Computers based on Motions and Positions of Hands", which claims the benefit of the filing dates of 62/325,925, filed Apr. 21, 2016 and entitled "Hand-Worn Devices for Controlling Computers based on Motions and Positions of Hands and Fingers", Prov. U.S. Pat. App. Ser. No. 62/463,183, filed Feb. 24, 2017 and entitled "Devices for Controlling Computers based on Motions and Positions of Hands and Arms," Prov. U.S. Pat. App. Ser. No. 62/463,209, filed Feb. 24, 2017 and entitled "Devices for Controlling Computers based on Motions and Positions of Hands," Prov. U.S. Pat. App. Ser. No. 62/463,252, filed Feb. 24, 2017 and entitled "Devices for Controlling Computers based on Motions and Positions of Hands and Arms," the entire disclosures of which applications are hereby incorporated herein by reference.

FIELD OF THE TECHNOLOGY

The embodiments disclosed herein relate to computer input devices in general and more particularly but not limited to input devices for virtual reality and/or augmented/mixed reality applications implemented using computing devices, such as mobile phones, smart watches, similar mobile devices, and/or other devices.

BACKGROUND

U.S. Pat. App. Pub. No. 2014/0028547 discloses a user control device having a combined inertial sensor to detect the movements of the device for pointing and selecting within a real or virtual three-dimensional space.

U.S. Pat. App. Pub. No. 2015/0277559 discloses a finger-ring-mounted touchscreen having a wireless transceiver that wirelessly transmits commands generated from events on the touchscreen.

U.S. Pat. App. Pub. No. 2015/0358543 discloses a motion capture device that has a plurality of inertial measurement units to measure the motion parameters of fingers and a palm of a user.

U.S. Pat. App. Pub. No. 2007/0050597 discloses a game controller having an acceleration sensor and a gyro sensor. U.S. Pat. No. D772,986 discloses the ornamental design for a wireless game controller.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least some embodiments disclosed herein allow arm movement tracking without a sensor device attached to the forearm. The forearm orientation is estimated, predicted, or computed from the orientation of the upper arm connected to the forearm and the orientation of the hand connected to the forearm.

Figure 1:
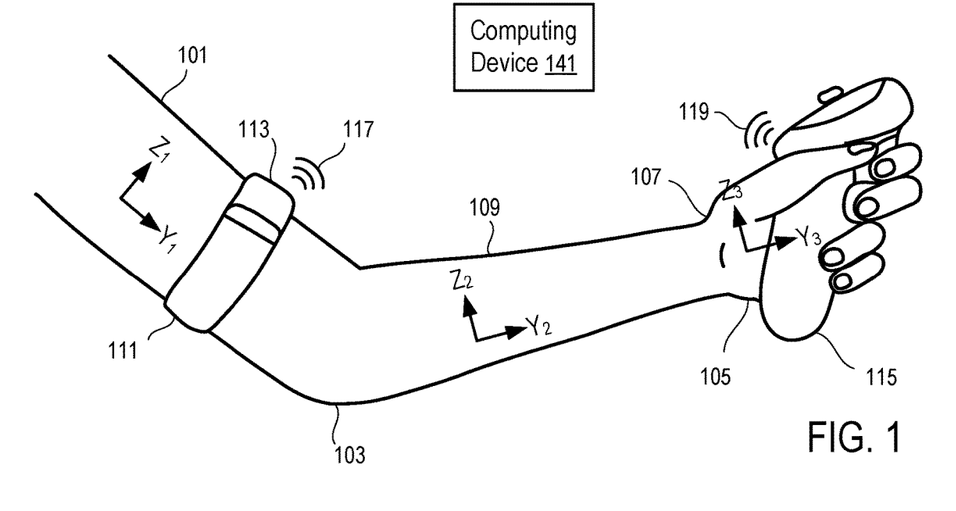
FIG. 1 illustrates a system to track arm movements according to one embodiment.

FIG. 1 illustrates a system to track arm movements according to one embodiment.

In FIG. 1, an elbow joint (103) of a user connects an upper arm (101) and a forearm (109) of the user; and a wrist (107) connects the forearm (109) to a hand (105) of the user.

The orientation of the upper arm (101) is tracked/determined using an arm module (113) that is attached to the upper arm (101) via an armband (111). The orientation of the upper arm (101) is represented by a local coordinate system $X_1Y_1Z_1$, where the lengthwise direction $Y_1$ is in parallel with the direction from the shoulder to the elbow joint (103), the direction $X_1$ is in parallel with the direction from the inner side of the upper arm (101) to the outer side of the upper arm (101), and the direction $Z_1$ is in parallel with the direction from the back side of the upper arm (101) to the front side of the upper arm (101).

The orientation of the hand (105) is tracked/determined using a handheld module (115). The orientation of the hand (105) is represented by a local coordinate system $X_3Y_3Z_3$, where the lengthwise direction $Y_3$ is in parallel with the direction from the wrist (105) to the fingers, the direction $X_3$ is in parallel with the direction from the back of the hand (105) to the palm of the hand (105), and the direction $Z_3$ is in parallel with the direction from the edge of the palm to the thumb on the hand (105).

Preferably, the arm module (113) and the handheld module (115) separately report their motion/orientation parameters to a computing device (141) using wireless connections (117 and 119), such as a personal area wireless network connection (e.g., Bluetooth connections), or a local area wireless network connection (e.g., Wi-Fi connections).

Alternatively, the arm module (113) may report its measurements to the handheld module (115) (via a wired or wireless connection); and the handheld module (115) communicates the motion/orientation measurements to the computing device (141) (e.g., via a wired or wireless connection).

For example, the handheld module (115) and the arm module (113) can be respectively a base unit (or a game controller) and an arm/shoulder module discussed in U.S. Pat. App. Pub. No. 15/492,915, filed Apr. 20, 2017 and entitled "Devices for Controlling Computers based on Motions and Positions of Hands", the entire disclosure of which application is hereby incorporated herein by reference.

At least some embodiments disclosed herein allow the orientation of the forearm (109) to be estimated, predicted, or calculated from the orientation of the hand (105) and the orientation of the upper arm (101) without the need for an additional sensor module to track the orientation of the forearm (109), as further discussed below.

Figure 2:
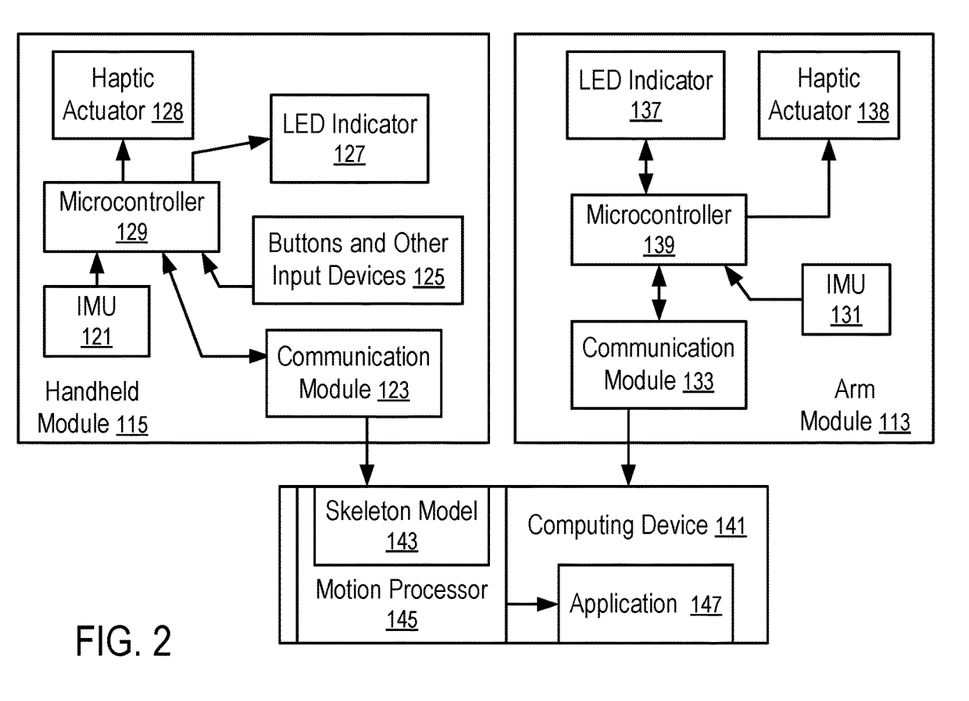
FIG. 2 illustrates a system to control computer operations according to one embodiment.

FIG. 2 illustrates a system to control computer operations according to one embodiment. For example, the system of FIG. 2 can be implemented via attaching the handheld module (115) and the arm module (113) to the hand (105) and the upper arm (101) respectively in a way illustrated in FIG. 1.

In FIG. 2, the handheld module (115) and the arm module (113) have micro-electromechanical system (MEMS) inertial measurement units (IMUs) (121 and 131) that measure motion parameters and determine orientations of the hand (105) and the upper arm (101).

Each of the IMUs (131, 121) has a collection of sensor components that enable the determination of the movement, position and/or orientation of the respective IMU along a number of axes. Examples of the components are: a MEMS accelerometer that measures the projection of acceleration (the difference between the true acceleration of an object and the gravitational acceleration); a MEMS gyroscope that measures angular velocities; and a magnetometer that measures the magnitude and direction of a magnetic field at a certain point in space. In some embodiments, the IMUs use a combination of sensors in three and two axes (e.g., without a magnetometer).

Figure 3:
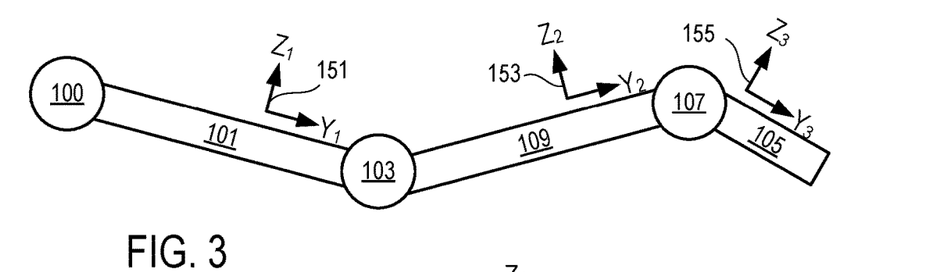
FIG. 3 illustrates a skeleton model of an arm.

The computing device (141) has a motion processor (145), which includes a skeleton model (143) of the upper arm (101), the forearm (109), and the hand (105) connected via the elbow joint (103) and the wrist (107) (e.g., illustrated FIG. 3). The motion processor (145) controls the movements of the corresponding parts of the skeleton model (143) according to the movements/orientations of the upper arm (101) and the hand (105) measured by the arm module (113) and the handheld module (115).

Since the forearm (109) does not have an attached sensor module, the movements/orientations of the forearm (109) is calculated/estimated/predicted from the orientation of the arm module (113) and the orientation of the handheld module (115), as discussed further below.

The skeleton model (143) as controlled by the motion processor (145) to generate inputs for an application (147) running in the computing device (141). For example, the skeleton model (143) can be used to control the movement of an avatar/model of the arm of the user of the computing device (141) in a video game, a virtual reality, a mixed reality, or augmented reality, etc.

In some applications, the handheld module (115) can be replaced with an arm module (113) attached to the hand (105) via holding or via a strap.

Preferably, the arm module (113) has a microcontroller (139) to process the sensor signals from the IMU (131) of the arm module (113) and a communication module (133) to transmit the motion/orientation parameters of the arm module (113) to the computing device (141). Similarly, the handheld module (115) has a microcontroller (129) to process the sensor signals from the IMU (121) of the handheld module (115) and a communication module (133) to transmit the motion/orientation parameters of the handheld module (115) to the computing device (141).

Optionally, the arm module (113) and the handheld module (115) have LED indicators (137 and 127) respectively to indicate the operating status of the modules (113 and 115).

Optionally, the arm module (113) and the handheld module (115) have haptic actuators (138 and 128) respectively to provide haptic feedback to the user via the modules (113 and 115).

Optionally, the handheld module (115) has buttons and other input devices (125), such as a touch sensor, a joystick, etc.

Typically, an IMU (e.g., 131 or 121) in a module (e.g., 113 or 115) generates acceleration data from accelerometers, angular velocity data from gyrometers/gyroscopes, and/or orientation data from magnetometers. The microcontrollers (139 and 129) perform preprocessing tasks, such as filtering the sensor data (e.g., blocking sensors that are not used in a specific application), applying calibration data (e.g., to correct the average accumulated error computed by the computing device (141)), transforming motion/position/orientation data in three axes into a quaternion, and packaging the preprocessed results into data packets (e.g., using a data compression technique) for transmitting to the host computing device (141) with a reduced bandwidth requirement and/or communication time.

Each of the microcontrollers (129, 139) may include a memory storing instructions controlling the operation of the respective microcontroller (129 or 139) to perform primary processing of the sensor data from the IMU (121, 131) and control the operations of the communication module (123, 133), and/or other components, such as the LED indicator (127, 137), the haptic actuator (128, 138), buttons and other input devices (125).

The computing device (141) may include one or more microprocessors and a memory storing instructions to implement the motion processor (145). The motion processor (145) may also be implemented via hardware, such as Application-Specific Integrated Circuit (ASIC) or Field-Programmable Gate Array (FPGA).

In some instances, one of the modules (113 and 115) is configured as a primary input device; and the other module is configured as a secondary input device that is connected to the computing device (141) via the primary input device. A secondary input device may use the microprocessor of its connected primary input device to perform some of the preprocessing tasks. A module that communicates directly to the computing device (141) is consider a primary input device, even when the module does not have a secondary input device that is connected to the computing device via the primary input device.

In some instances, the computing device (141) specifies the types of input data requested, and the conditions and/or frequency of the input data; and the modules (113 and 115) report the requested input data under the conditions and/or according to the frequency specified by the computing device (141). Different reporting frequencies can be specified for different types of input data (e.g., accelerometer measurements, gyroscope/gyrometer measurements, magnetometer measurements, position, orientation, velocity).

In general, the computing device (141) may be a data processing system, such as a mobile phone, a desktop computer, a laptop computer, a head mount virtual reality display, a personal medial player, a tablet computer, etc.

FIG. 3 illustrates a skeleton model of an arm. For example, the skeleton model of FIG. 3 can be used in the motion processor (145) of FIG. 2 to determine the orientation of the forearm (109) that does not have an attached sensor module, as illustrated in FIG. 1.

FIG. 3 shows the geometrical representations of the upper arm (101), the forearm (109), and the hand (105) in relation with the elbow joint (103) and the wrist (107) relative to the shoulder (100).

Each of the upper arm (101), the forearm (109), and the hand (105) has an orientation relative to a common reference system (e.g., the shoulder (100), a room, or a location on the Earth where the user is positioned). The orientation of the upper arm (101), the forearm (109), or the hand (105) can be indicated by a local coordinate system (151, 153, or 155) aligned with the upper arm (101), the forearm (109), or the hand (105).

The orientation of the upper arm (101) and the orientation of the hand (105), as represented by the local coordinate systems (151 and 155) can be calculated from the motion parameters measured by the IMUs in the module (113 and 105) attached to the upper arm (101) and the hand (105).

Since the forearm (109) does not have an attached IMU for the measurement of its orientation, the motion processor (145) uses a set of assumed relations between the movements of the forearm (109) and the hand (105) to calculate or estimate the orientation of the forearm (109) based on the orientation of the upper arm (101) and the orientation of the hand (105), as further discussed below.

Figure 4:
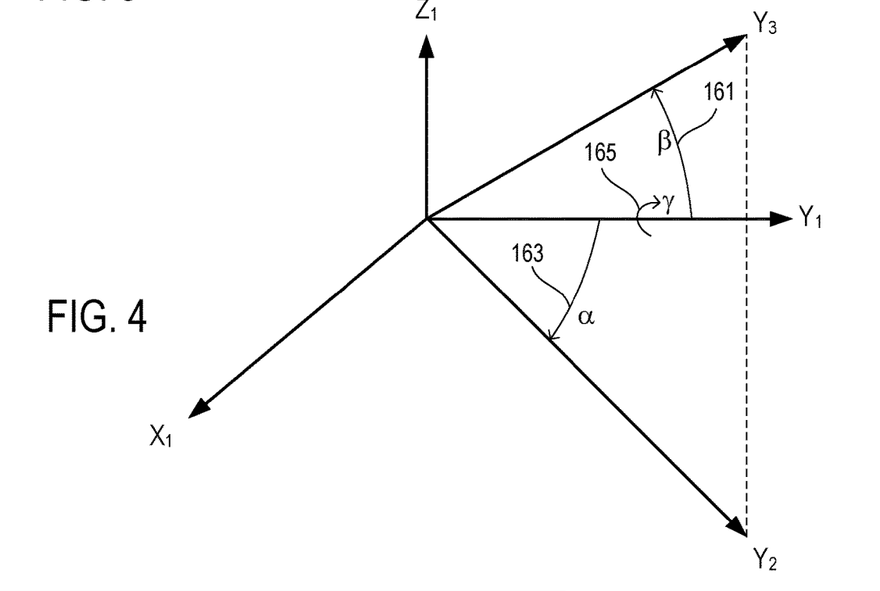
FIG. 4 illustrates the determination of the orientation of a forearm according to one embodiment.

FIG. 4 illustrates the determination of the orientation of a forearm according to one embodiment.

In FIG. 4, the coordinate system $X_1Y_1Z_1$ represents the orientation of the upper arm (101), where the direction $Y_1$ is along the lengthwise direction of the upper arm (101) pointing from the shoulder (100) to the elbow joint (103), as illustrated in FIG. 3. The directions $X_1$ and $Z_1$ are perpendicular to the direction $Y_1$. The direction $X_1$ is parallel to the direction from the back side of the upper arm (101) to the front side of the upper arm (101); and the direction $X_1$ is parallel to the direction from the inner side of the upper arm (101) to the outer side of the upper arm (101).

When the arm is in a vertical direction pointing downwards with the hand (105) facing the body of the user, the lengthwise directions $Y_1$, $Y_2$, and $Y_3$ of the upper arm (101), the forearm (109), and the hand (105) are aligned with the vertical direction pointing downwards. When in such a position, the inner sides of the forearm (109) and the upper arm (101) are closest to the body of the user; and the outer sides of the forearm (109) and the upper arm (101) are away from the body of the user; the directions $Z_1$, $Z_2$, and $Z_3$ of the upper arm (101), the forearm (109), and the hand (105) are aligned with a direction pointing sideway to the user; and the directions $Z_1$, $Z_2$, and $Z_3$ of the upper arm (101), the forearm (109), and the hand (105) are aligned with a direction pointing to the front of the user.

Thus, the plane $X_1Y_1$ is parallel to the direction $X_1$ from the back side of the upper arm (101) to the front side of the upper arm (101), parallel to the lengthwise direction $Y_1$ of the upper arm (101), and perpendicular to the direction $Z_1$ from the direction from the inner side of the upper arm (101) to the outer side if the upper arm (101). The direction $Z_1$ coincides with an axis of the elbow joint about which the forearm (109) can rotate to form an angle with the upper arm (101) between their lengthwise directions. When the upper arm (101) is extended in the sideway of the user and in a horizontal position, the directions $X_1$ and $Z_1$ are aligned with (in parallel with) the front direction and vertical direction respectively.

The direction $Y_2$ is aligned with the lengthwise direction of the forearm (109) pointing from the elbow joint (103) to the wrist (107).

The direction $Y_3$ is aligned with the lengthwise direction of the hand (105) pointing from the wrist (107) towards the fingers.

When the upper arm (101) is extended in the sideway of the user and in a horizontal position, the directions $Y_1$, $Y_2$, and $Y_3$ coincide with the horizontal direction pointing the sideway of the user.

When the hand (105) is moved to an orientation illustrated in FIG. 4, the hand (105) can be considered to have moved from the orientation of the coordinate system $X_1Y_1Z_1$ through rotating (165) by an angle γ along the lengthwise direction $Y_1$ and then rotating (161) along the shortest arc (161) such that its lengthwise direction $Y_3$ arrives at the direction illustrated in FIG. 4. The rotation (161) along the shortest arc (161) corresponding to a rotation of the direction $Y_1$ by an angle β in a plane containing both the directions $Y_1$ and $Y_3$ along an axis perpendicular to both the directions $Y_1$ and $Y_3$ (i.e., the axis is perpendicular to the plane containing both the directions $Y_1$ and $Y_3$).

The projection of the direction $Y_3$ in the plane $X_1Y_1$ is assumed to be in the direction of the lengthwise direction $Y_2$ of the forearm (109). The projection represents a rotation (163) of the direction $Y_1$ by an angle α in the plane $X_1Y_1$ along the direction $Z_1$ according to the shortest arc (163).

It is assumed that the rotation (165) of the hand (105) along its lengthwise direction is a result of the same rotation of the forearm (109) along its lengthwise direction while the forearm (109) is initially at the orientation aligned with the coordinate system $X_1Y_1Z_1$. Thus, when the hand (105) has an orientation illustrated in FIG. 4 relative to the orientation ($X_1Y_1Z_1$) of the upper arm (101), the orientation of the forearm (109) is assumed to have moved from the orientation of the coordinate system $X_1Y_1Z_1$ by rotating (165) along the lengthwise direction $Y_1$ and then rotating (163) in the plane $Y_1$ along the direction $Z_1$.

Since the rotations (165, 161 and 163) can be calculated from the orientation of the hand (105) relative to the orientation of the upper arm (101) (e.g., using the orientation data measured by the IMUs of the arm module (113) and the handheld module (115)), the orientation of the forearm (109) can be calculated from the rotations (165 and 163) without measurement data from an IMU attached to the forearm (109).

After the orientations of the upper arm (101), the forearm (109) and the hand (105) are obtained, the motion processor (145) can compute the positions of the upper arm (101), the forearm (109) and the hand (105) in a three dimensional space (relative to the shoulder (100)), which allows the application (147) to present an arm of an avatar in a virtual reality, augmented reality, or mixed reality in accordance with the movement of the arm of the user. The positions of the upper arm (101), the forearm (109) and the hand (105) in a three dimensional space (relative to the shoulder (100)) can also be used to determine the gesture made by the user in the three dimensional space to control the application (147).

Figure 5:
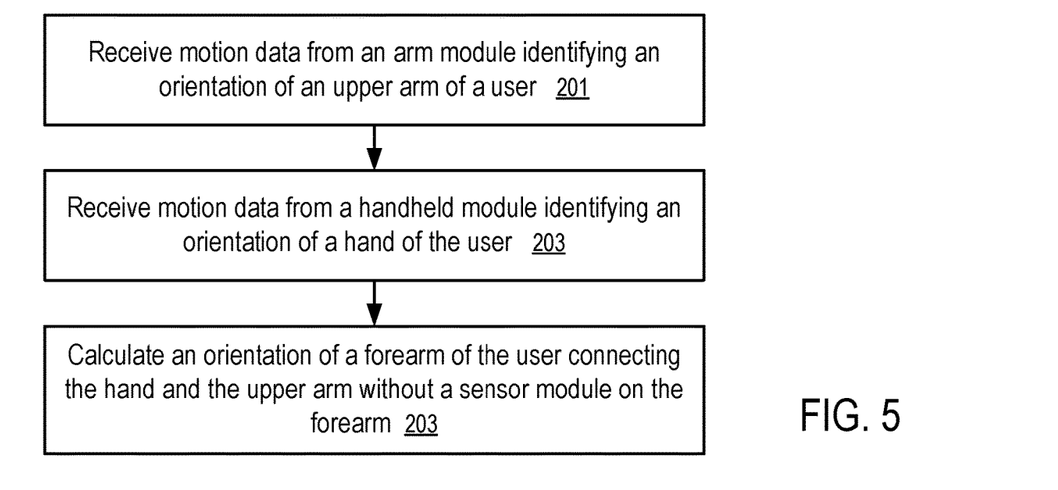
FIG. 5 shows a method to compute the orientation of a forearm according to one embodiment.

FIG. 5 shows a method to compute the orientation of a forearm according to one embodiment. For example, the method of FIG. 5 can be implemented in a system illustrated in FIG. 2 with an arm module (113) and a handheld module (115) attached to a hand (105) and an upper arm (101) in a way illustrated FIG. 1 and using the geometrical relations identified via FIG. 3 and FIG. 4.

In FIG. 5, a computing device (141) receives (201) motion data from an arm module (113) identifying an orientation of an upper arm (101) of a user, receives (203) motion data from a handheld module (115) identifying an orientation of a hand (105) of the user, and calculates (203) an orientation of a forearm (109) of the user connecting the hand (105) and the upper arm (101) without a sensor module on the forearm (109).

Figure 6:
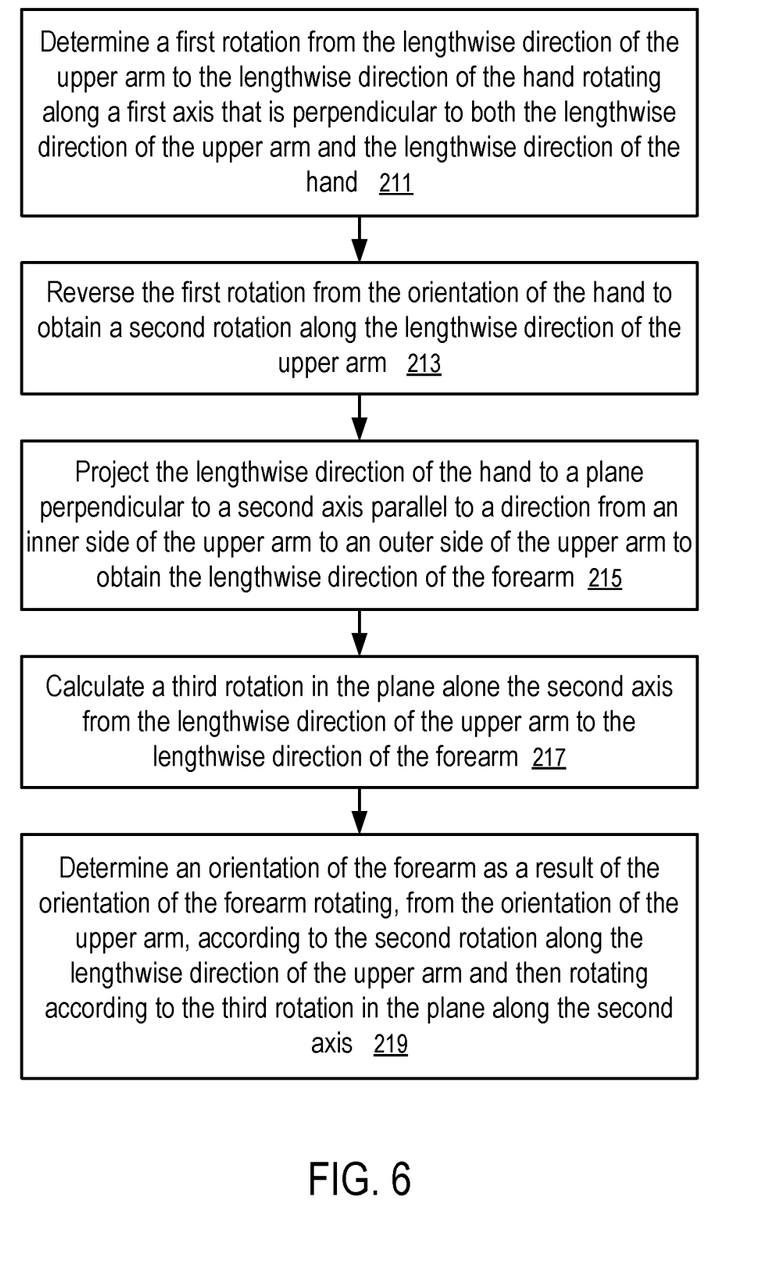
FIG. 6 shows a detailed method to compute the orientation of a forearm according to one embodiment.

FIG. 6 shows a detailed method to compute the orientation of a forearm according to one embodiment. For example, the method of FIG. 6 can be used to implement the calculation (203) of the orientation of the forearm (109) in the method of FIG. 5.

In FIG. 6, the calculation (203) of the orientation of the forearm (109) is performed by: determining (211) a first rotation β from the lengthwise direction $Y_1$ of the upper arm (101) to the lengthwise direction $Y_3$ of the hand (105), where the first rotation β rotates along a first axis that is perpendicular to both the lengthwise direction $Y_1$ of the upper arm (101) and the lengthwise direction $Y_3$ of the hand (105); reversing (213) the first rotation β from the orientation of the hand (105) to obtain a second rotation γ along the lengthwise direction $Y_1$ of the upper arm (101); projecting (215) the lengthwise direction $Y_3$ of the hand (105) to a plane $X_1Y_1$ that is perpendicular to a second axis $Z_1$ parallel to a direction from an inner side of the upper arm (101) to an outer side of the upper arm (101) to obtain the lengthwise direction $Y_2$ of the forearm (109); calculating (217) a third rotation α that rotates within the plane $X_1Y_1$ and alone the second axis $Z_1$ from the lengthwise direction $Y_1$ of the upper arm (101) to the lengthwise direction $Y_2$ of the forearm (109); and determining (219) an orientation of the forearm (109) as a result of the orientation $X_2Y_2Z_2$ of the forearm (109) rotating, from the orientation $X_1Y_1Z_1$ of the upper arm (101), according to the second rotation γ along the lengthwise direction $Y_1$ of the upper arm (101), and then rotating according to the third rotation α in the plane $X_1Y_1$ and along the second axis $Z_1$.

As illustrated in FIG. 2, each of the arm module (113) and the handheld module (115) is a sensor module that has an inertial measurement unit (IMU) (131, 121) for their orientation measurements. Preferably, the sensor module has a wireless communication device or module (133, 123) for a wireless communication link (117, 119) with the computing device (141). Alternatively, wired connections can be used. The inertial measurement unit (IMU) (131, or 121) of the sensor module (113, or 115) may include a micro-electromechanical system (MEMS) gyroscope, a magnetometer, and/or a MEMS accelerometer.

The method of FIG. 6 allows the calculation of the estimated/approximated orientation of the forearm (109) without a need for a separate inertial measurement unit or sensor module attached to the forearm (109) of the user, which arrangement reduces the cost of the system and improves user experiences.

As an example, the orientation of the forearm can be calculated using the following quaternion calculations.

The orientations of the upper arm (101) and the hand (105) can be expressed as quaternion variables $q_s$ and $q_h$. The quaternion of rotation between the upper arm (101) and the hand (105) can be calculated as $q_{hs}=q_s^{-1}*q_h$. The lengthwise direction of the upper arm (101) is known for the orientation transformation between the upper arm (101) and the hand (105) (e.g., vector {0; 1; 0} for the left hand and vector {0; −1; 0} for the right hand). When the lengthwise direction of the upper arm (101) is expressed as vector o, the lengthwise direction of the hand (105) can be calculated as vector $h=q_{hs}*o*q_{hs}^{-1}$. When the projection of h in the plane containing the lengthwise direction of the upper arm and the direction from the back of the upper arm to the front of the upper arm is expressed as vector f, the quaternion of rotation (α) along the shortest arc from the vector o to the vector f can be calculated as $qzx_{fs}$. Similarly, the quaternion of rotation (β) along the shortest arc from the vector o to the vector h can be calculated as $qzx_{hs}$. Since the quaternion of rotation (γ) along the lengthwise direction of the upper arm (101) is $qzx_{hs}^{-1}*q_{hs}$, the quaternion of rotation between the upper arm (101) and the forearm (109) is $q_{fs}=qzx_{fs}*qzx_{hs}^{-1}*q_{hs}$. Thus, the quaternion orientation of the forearm (109) is $q_f=q_s*q_{fs}$.

The present disclosure includes methods and apparatuses which perform these methods, including data processing systems which perform these methods, and computer readable media containing instructions which when executed on data processing systems cause the systems to perform these methods.

For example, the computing device (141), the arm module (113) and/or the handheld module (115) can be implemented using one or more data processing systems.

A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
    a first sensor module having an inertial measurement unit and configured to be attached to an upper arm of a user and to generate first motion data identifying an orientation of the upper arm;
    a second sensor module having an inertial measurement unit and configured to be held in a hand of the user and to generate second motion data identifying an orientation of the hand; and
    a computing device communicatively coupled to the first sensor module and the second sensor module through communication links, the computing device configured to calculate, based on the orientation of the upper arm and the orientation of the hand relative to the orientation of the upper arm but without a sensor module attached to a forearm, an orientation of the forearm connected to the hand by a wrist of the user and connected to the upper arm by an elbow joint of the user,
    wherein the computing device calculates the orientation of the forearm by:
        determining a first rotation from a lengthwise direction of the upper arm to a lengthwise direction of the hand rotating along a first axis;
        reversing the first rotation along the first axis from the orientation of the hand to obtain a second rotation;
        projecting, on to a plane, the lengthwise direction of the hand to obtain a lengthwise direction of the forearm;
        calculating a third rotation from the lengthwise direction of the upper arm to the lengthwise direction of the forearm along a second axis; and determining, by the computing device, the orientation of the forearm as a combination of an initial orientation aligned with the upper arm rotated according to the second rotation along the lengthwise direction of the upper arm and then rotated according to the third rotation along the second axis.

2. The system of claim 1, wherein each of the first sensor module and the second sensor module further includes a communication device for a communication link with the computing device.

3. The system of claim 1, wherein each of the inertial measurement unit of the first sensor module and the inertial measurement of the second sensor module includes a microelectromechanical system (MEMS) gyroscope.

4. The system of claim 3, wherein each of the inertial measurement unit of the first sensor module and the inertial measurement of the second sensor module further includes a magnetometer and a MEMS accelerometer.

5. The system of claim 1, wherein the orientation of the forearm is calculated without an inertial measurement unit attached to the forearm of the user.

6. The system of claim 1, wherein the orientation of the forearm is calculated without a sensor module on the forearm of the user.

7. The system of claim 1, wherein the first axis is perpendicular to both the lengthwise direction of the upper arm and the lengthwise direction of the hand; and
wherein the second axis is perpendicular to the plane.

8. The system of claim 7, wherein the second axis is parallel to a direction from an inner side of the upper arm to an outer side of the upper arm; and the plane is parallel with the lengthwise direction of the upper arm and a direction from a back side of the upper arm to a front side of the upper arm.

9. A method, comprising:
receiving, from a first sensor module attached to an upper arm of a user, first motion data identifying an orientation of the upper arm;
receiving, from a second sensor module held in a hand of the user, second motion data identifying an orientation of the hand; and
calculating, based on the orientation of the upper arm and the orientation of the hand relative to the orientation of the upper arm but without a sensor module attached to a forearm, an orientation of the forearm connected to the hand by a wrist of the user and connected to the upper arm by an elbow joint of the user, wherein the orientation of the forearm is calculated by:
determining a first rotation from a lengthwise direction of the upper arm to a lengthwise direction of the hand rotating along a first axis;
reversing the first rotation along the first axis from the orientation of the hand to obtain a second rotation;
projecting, on to a plane, the lengthwise direction of the hand to obtain a lengthwise direction of the forearm;
calculating a third rotation from the lengthwise direction of the upper arm to the lengthwise direction of the forearm along a second axis; and
determining, by a computing device, the orientation of the forearm as a combination of an initial orientation aligned with the upper arm rotated according to the second rotation along the lengthwise direction of the upper arm and then rotated according to the third rotation along the second axis.

10. The method of claim 9, further comprising:
determining a position of the hand in a three dimensional space based on the orientation of the upper arm, and the orientation of the forearm, the orientation of the hand, and a skeleton model of the upper arm, the forearm, and the hand.

11. The method of claim 10, wherein the plane is perpendicular to a direction pointing from an inner side of the upper arm and an outer side of the upper arm.

12. The method of claim 11, wherein the plane is parallel to the lengthwise direction of the upper arm.

13. The method of claim 12, wherein the plane is further parallel to a direction pointing from a back side of the upper arm to a front side of the upper arm.

14. A non-transitory computer storage medium storing instructions which, when executed by a processor of a computing device, instructs the computing device to perform a method, the method comprising:
receiving, by the computing device from a first sensor module attached to an upper arm of a user, first motion data identifying an orientation of the upper arm;
receiving, by the computing device from a second sensor module held in a hand of the user, second motion data identifying an orientation of the hand;
calculating, by the computing device based on the orientation of the upper arm and the orientation of the hand relative to the orientation of the upper arm but without a sensor module attached to a forearm, an orientation of the forearm connected to the hand by a wrist of the user and connected to the upper arm by an elbow joint of the user;
determining, by the computing device, a first rotation of a lengthwise direction of the hand from a lengthwise direction of the upper arm along a closest arc to the lengthwise direction of the hand in the orientation of the hand relative to the upper arm;
reversing, by the computing device, the first rotation from the orientation of the hand relative to the upper arm to obtain a second rotation;
projecting, on to a plane by the computing device, the lengthwise direction of the hand to determine a lengthwise direction of the forearm;
computing, by the computing device, a third rotation from the lengthwise direction of the upper arm to the lengthwise direction of the forearm along a second axis; and
determining, by the computing device, the orientation of the forearm based on combination of an initial orientation aligned with the upper arm rotated according to the second rotation along the lengthwise direction of the upper arm and then rotated according to the third rotation along the second axis.

15. The non-transitory computer storage medium of claim 14, wherein the plane is perpendicular to a direction pointing from an inner side of the upper arm and an outer side of the upper arm.

16. The non-transitory computer storage medium of claim 15, wherein the plane is parallel to the lengthwise direction of the upper arm.

17. The non-transitory computer storage medium of claim 16, wherein the plane is further parallel to a direction pointing from a back side of the upper arm to a front side of the upper arm.

* * * * *